(12) United States Patent
Horie et al.

(10) Patent No.: US 6,876,373 B2
(45) Date of Patent: Apr. 5, 2005

(54) LASER POWER CORRECTION METHOD AND DEVICE FOR THE SAME

(75) Inventors: Yasuyuki Horie, Hitachinaka (JP); Katsumi Ishizawa, Hitachinaka (JP); Souichi Nakazawa, Hitachinaka (JP)

(73) Assignee: Hitachi Printing Solutions, Ltd., Ebina (JP)

( * ) Notice: Subject to any disclaimer, the term of this patent is extended or adjusted under 35 U.S.C. 154(b) by 0 days.

(21) Appl. No.: 10/339,569

(22) Filed: Jan. 10, 2003

(65) Prior Publication Data

US 2003/0133001 A1 Jul. 17, 2003

(30) Foreign Application Priority Data

Jan. 11, 2002 (JP) ...................................... 2002-005262

(51) Int. Cl.[7] .............................. B41J 2/385; B41J 2/435
(52) U.S. Cl. ...................... 347/132; 347/246; 347/236
(58) Field of Search ........................... 399/39; 358/518; 347/132, 236, 246, 237, 247, 133

(56) References Cited

U.S. PATENT DOCUMENTS

| | | | | |
|---|---|---|---|---|
| 4,617,469 A | * | 10/1986 | Takahashi et al. | ........... 250/548 |
| 4,620,234 A | * | 10/1986 | Watanabe | .................... 358/497 |
| 4,794,413 A | * | 12/1988 | Yamazaki et al. | ........... 347/247 |
| 4,898,198 A | * | 2/1990 | Castlebury | .................... 135/90 |
| 5,347,298 A | * | 9/1994 | Gokita | ......................... 347/133 |
| 5,550,573 A | * | 8/1996 | Serizawa et al. | ............ 347/246 |
| 5,765,060 A | * | 6/1998 | Shimizu | ...................... 396/268 |
| 5,774,760 A | * | 6/1998 | Nagashima | ................... 399/39 |
| 5,963,242 A | * | 10/1999 | Nakayama et al. | .......... 347/238 |
| 5,986,687 A | * | 11/1999 | Hori | ............................ 347/246 |
| 6,078,347 A | * | 6/2000 | Nukui | .......................... 347/246 |
| 6,151,056 A | * | 11/2000 | Araki | ........................... 347/246 |
| 6,664,996 B2 | * | 12/2003 | Mano | ........................... 347/236 |

FOREIGN PATENT DOCUMENTS

| | | |
|---|---|---|
| JP | 05-291659 | 11/1993 |
| JP | 08-101416 | 4/1996 |
| JP | 2001-260417 | 9/2001 |

* cited by examiner

*Primary Examiner*—Andrew H. Hirshfeld
*Assistant Examiner*—Wasseem H. Hamdan
(74) *Attorney, Agent, or Firm*—McGinn & Gibb, PLLC

(57) ABSTRACT

An electrophotographic device with a laser power correction device (and method therefor) includes a laser power detection sensor retractably disposed relative to a laser beam optical path of a laser beam, a laser power adjusting device for controlling laser power of the laser beam based on an output from the laser power detection sensor, and a controller for inserting the laser power detection sensor into the optical path and applying laser power correction when a total laser beam activation time has reached a predetermined time and printing is stopped.

7 Claims, 4 Drawing Sheets

LASER POWER CORRECTION METHOD AND DEVICE FOR THE SAME

BACKGROUND OF THE INVENTION

1. Field of the Invention

The present invention relates to a method for correcting laser power and a laser power correcting device for electrophotographic devices, and more particularly to a laser power correction device that stabilizes print quality and allows variation in print density within individual printing volume units.

2. Description of the Related Art

In electrophotographic devices such as laser printers and copiers, variations in laser power to exposure surfaces (e.g., primarily photosensitive bodies) due to changes in the environment (e.g., the surrounding temperature) and the like can prevent exposure of the photosensitive body at a uniform exposure power. This can lead to uneven print density. Generally, methods such as applying a correction factor to the laser power for each raster period are used so that the laser power on the photosensitive body is the desired value.

However, with the above methods, when laser power is corrected for each raster period, print density can change within individual units of print volume. Thus, a uniform print quality is prevented for each print volume unit.

SUMMARY OF THE INVENTION

In view of the foregoing and other problems, drawbacks, and disadvantages of the conventional methods and structures, a purpose of the present invention is to provide a laser power correction method and laser power correction device for electrophotographic devices that can minimize (if not prevent) variations in print density within print volume units to achieve stable print quality.

In a first aspect of the invention, a laser power correction device for electrophotographic devices includes a laser power detection sensor retractably disposed relative to a laser beam optical path, a laser power adjusting unit for controlling laser power of the laser beam based on an output from the laser power detection sensor, and a controller for inserting the laser power detection sensor into the optical path, and for applying laser power correction when a total laser beam activation time has reached a predetermined time and printing is stopped.

According to another aspect of the invention, the invention preferably includes a laser light source for generating the laser beam for optically recording onto an exposure surface.

According to another aspect of the invention, an internal sensor is preferably located within the laser light source for monitoring laser power from the laser light source.

According to another aspect of the invention, the internal sensor preferably monitors the laser power continuously.

According to another aspect of the invention, the laser power is preferably adjusted at predetermined short intervals by a laser power adjusting device while the internal sensor monitors the laser power continuously.

According to another aspect of the invention, the laser power detection sensor preferably is located at a position external to the laser light source.

According to another aspect of the invention, the laser power detection sensor preferably is movable in a direction perpendicular to a direction of the laser beam optical path.

According to another aspect of the invention, the laser power detection sensor preferably monitors the laser power intermittently at predetermined intervals.

According to another aspect of the invention, the internal sensor preferably outputs a first signal to the laser power adjusting device.

According to another aspect of the invention, the laser power detection sensor preferably outputs a second signal to the laser power adjusting device.

According to another aspect of the invention, the laser power adjusting device preferably outputs a third signal, based upon an input of at least one of the first signal and the second signal, to the laser light source to fix an output of the laser power of the laser beam.

In an additional aspect of the invention, a method of correcting laser power in an electrophotographic device includes sensing the laser beam with a laser power detection sensor retractably disposed relative to a laser beam optical path, controlling laser power of the laser beam based on output from the laser power detection sensor, inserting the laser power detection sensor into the optical path, and applying laser power correction when a total laser beam activation time has reached a predetermined time and printing is stopped.

According to another aspect of the invention, a method of correcting laser power in an electrophotographic device preferably includes generating the laser beam with a laser light source for optically recording onto an exposure surface.

According to another aspect of the invention, a method of correcting laser power in an electrophotographic device preferably includes monitoring laser power from the laser light source with an internal sensor located within the laser light source.

According to another aspect of the invention, the method preferably includes monitoring the laser power continuously with the internal sensor.

According to another aspect of the invention, the method preferably includes adjusting the laser power at predetermined short intervals while the internal sensor monitors the laser power continuously.

According to another aspect of the invention, the method of correcting laser power in an electrophotographic device preferably uses a laser power detection sensor located external to the laser light source.

According to another aspect of the invention, inserting the laser power detection sensor into the optical path preferably includes moving the laser power detection sensor in a direction perpendicular to a direction of the laser beam optical path.

According to another aspect of the invention, sensing the laser beam with a laser power detection sensor preferably includes monitoring the laser power intermittently at predetermined intervals.

According to another aspect of the invention, the laser power preferably is adjusted based upon an input of a first signal from the internal sensor and a second signal from the laser power detection sensor.

In a further aspect of the invention, a laser power correction device for electrophotographic devices preferably includes a laser power detection sensor retractably disposed relative to a laser beam optical path of the laser beam, a laser power adjustor for adjusting laser power of the laser beam to a predetermined value based on output from the laser power detection sensor, and a controller for inserting the laser power detection sensor into the optical path.

According to another aspect of the invention, a laser power correction device for electrophotographic devices preferably further includes a laser light source generating a laser beam for optically recording onto an exposure surface.

According to another aspect of the invention, the controller for inserting the laser power detection sensor into the optical path preferably applies a laser power correction when a total laser beam activation time has reached a predetermined time and printing is stopped.

BRIEF DESCRIPTION OF THE DRAWINGS

The foregoing and other purposes, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
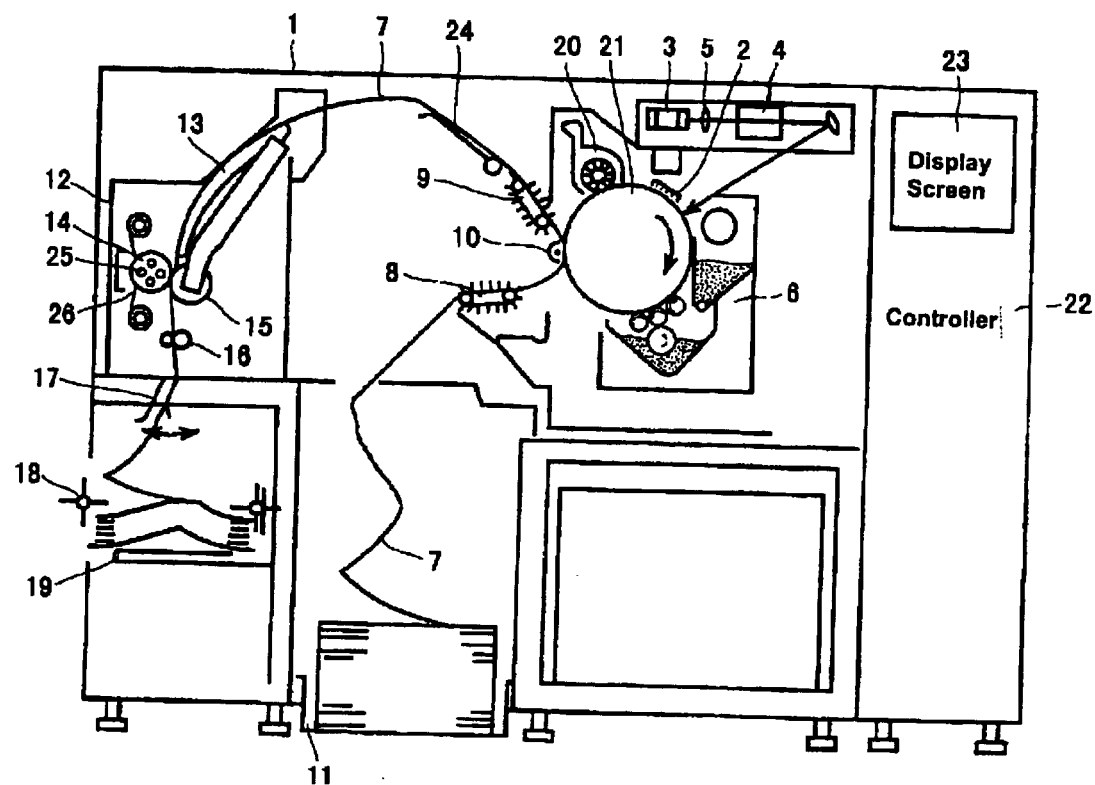
FIG. 1 illustrates an overall architecture 100 of an electrophotographic device in which a laser power correcting device 4 is implemented according to the present invention.

Referring now to the drawings, and more particularly to FIGS. 1–4, there are shown preferred embodiments of the method and structures according to the present invention.

Preferred Embodiments

FIG. 1 illustrates an example of the overall structure 100 of a laser printer using an electrophotographic system in which the present invention is implemented. In the laser beam printer 1, a controller 22 thereof sends a signal to begin printing operations, and in response thereto a photosensitive drum 21 starts rotating in the direction indicated by the arrow (e.g., clockwise, as shown in FIG. 1).

The photosensitive, drum 21 rotates at a speed corresponding to the print speed of the laser beam printer 1, and continues turning until the printing operation is completed. When the photosensitive drum 21 begins turning, a high voltage is applied to a corona charger 2 so that the surface of the photosensitive drum 21 is uniformly charged (e.g., with a positive charge).

Figure 2:
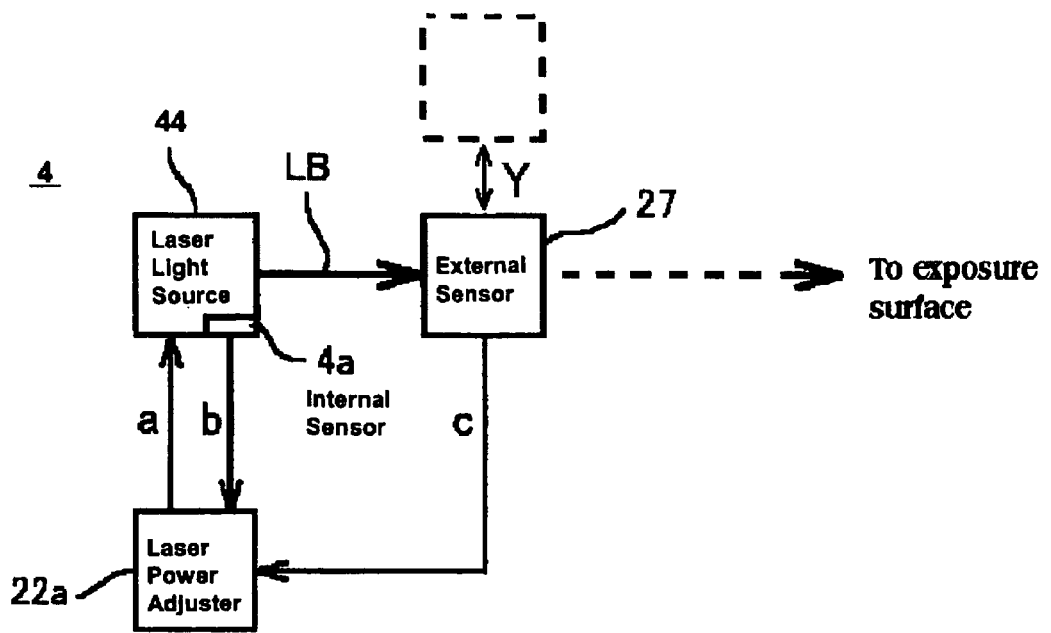
FIG. 2 is a simplified schematic block diagram of the laser power correcting device 4 for electrophotographic devices according to the present invention.

A rotating polygonal mirror 3 begins turning when the power to the laser beam printer 1 is turned on, and a fixed speed is maintained in a highly accurate manner. A laser power correction device 4, including a laser light source 44 (e.g., as shown in FIG. 2) formed from a semiconductor laser or the like, outputs a laser beam, which is reflected off the rotating polygonal mirror 3 and scans the photosensitive drum 21 by way of an f-theta (θ) lens 5.

Character and graphic data converted to a dot image are sent to the laser beam printer 1 from the controller 22 in the form of on/off signals. Areas that receive the laser beam and those that do not receive the laser beam are formed on the surface of the photosensitive drum 21, thereby resulting in an "electrostatic latent image". Toner is supplied to the electrostatic latent image, and charged toner (e.g., with a positive charge), is drawn by electrostatic energy to the areas on the photosensitive drum 21 from which charge was lost due to exposure to the laser beam. Thus, a toner image is formed on the photosensitive drum 21.

A continuous sheet 7 stored in a sheet hopper (e.g., tray, container or the like) 11 is transported by a sheet-feeding tractor 8 so that the sheet 7 is between the photosensitive drum 21 and an image transfer device 10 when the toner image of the print data formed on the photosensitive drum 21 reaches the image-transfer position.

The toner image formed on the photosensitive drum 21 is absorbed by the sheet 7 by the action of the image transfer device 10. That is, the image transfer device 10 applies a charge to the back of the sheet 7 having a polarity opposite that of the toner image.

In this manner, the sheet 7 set up in the sheet hopper 11 passes through the sheet-feeding tractor 8, the image transfer device 10, a sheet-feeding tractor 9, and a buffer plate 24 and reaches a fusing device 12. The sheet 7 at the fusing device 12 is pre-heated by a pre-heater 13. Then, heat and pressure is applied by a nip section formed by a pressure-application roller 15 and a heating roller 14 equipped with a heater lamp 25. The sheet 7 is fed through these rollers 14, 15 so that the toner image is fused to the sheet 7.

The sheet 7 output by the heating roller 14 and the pressure-application roller 15 is transported to a stacker table 19 by a sheet ejection roller 16, and a pivoting action of a swing fin 17 folds the sheet 7 along a sewing (e.g., perforated) line. A rotating paddle 18 aligns the folds as the sheet 7 is stacked onto the stacker table 19. The regions of the photosensitive drum 21 that have passed the image-transfer position are cleaned by a cleaning device 20 to prepare the photosensitive drum for the next printing operation.

As shown in FIG. 1, the exemplary embodiment of the present invention also includes a display screen 23 that indicates information related to the status of the laser beam printer 1. The buffer plate 24 serves to absorb slack and tension in the sheet 7 if there are variations in the transport speed between the sheet-feeding tractor 9 and the fusing rollers 14, 15. Also, a web member 26 can come into contact with the surface of the heating roller 14, and can be taken up so that the surface of the heating roller 14 can be cleaned and so that a releasing agent can be applied to the surface of the heating roller 14.

Embodiment 1

FIG. 2 shows, in an exemplary embodiment of a laser power correction device 4 of the present invention, a laser light source 44, a laser power detection sensor 4a disposed inside the laser light source 44 (e.g., hereinafter referred to as an "internal sensor"), and a laser power adjuster 22a for generating a signal a based on a signal b from the internal sensor 4a, and for controlling the laser power so that an output LB from the laser light source 44 is fixed.

In addition to the internal sensor 44a, the laser power correction device 4 of the present invention includes a separate external sensor 27. The external sensor 27 is movable along directions indicated by the Y arrow (e.g., perpendicular to a direction of the output LB from the laser light source 44), as shown in FIG. 2). That is, external sensor 27 can be selectively reciprocated back and forth in the directions of the Y arrow. Thus, when the power of the laser beam LB is to be measured, the external sensor 27 is inserted into the optical path at the position indicated by the solid lines (e.g., as shown in FIG. 2). At other times, the external sensor 27 is retracted to the position indicated by the dotted lines (e.g., as shown in FIG. 2).

The laser power of the light source 44 is corrected by the laser power adjuster 22a so that the output signals b, c from the internal sensor 4a and the external sensor 27 indicate a predetermined output.

In the configuration of the non-limiting embodiment described above, when laser power is to be corrected, the laser power from the laser light source 44 is detected continuously by the internal sensor 4a, and laser power is corrected at short intervals by the laser power adjuster 22a so that the output signal b indicates a predetermined output.

The laser power adjustment period of the internal sensor 4a is preferably set to predetermined (e.g., relatively short) intervals so that variations in contrast will not significantly affect printing quality. However, even if the laser power from the laser light source 44 remains fixed, debris or external factors at the lenses and mirrors disposed along the optical path from the laser light source 44 to the photosensitive body can vary the laser power to the photosensitive body over time.

To overcome this problem, the external sensor 27 is advantageously disposed so as to detect laser power from outside (e.g., a location external to the laser light source 44). In particular, with high-speed printing devices, maintaining a uniform print quality for individual units of printing volume is important. If laser power is corrected for each raster interval, then the correction would result in varying darkness within print volume units. Thus, there can be cases where a uniform print quality cannot be maintained for individual printing volume units.

If the laser power correction based on detection results from the external sensor 27 is applied when a predetermined amount of laser activation time has elapsed and when printing is stopped, uniform print quality for individual printing volume units can be ensured.

Figure 3:
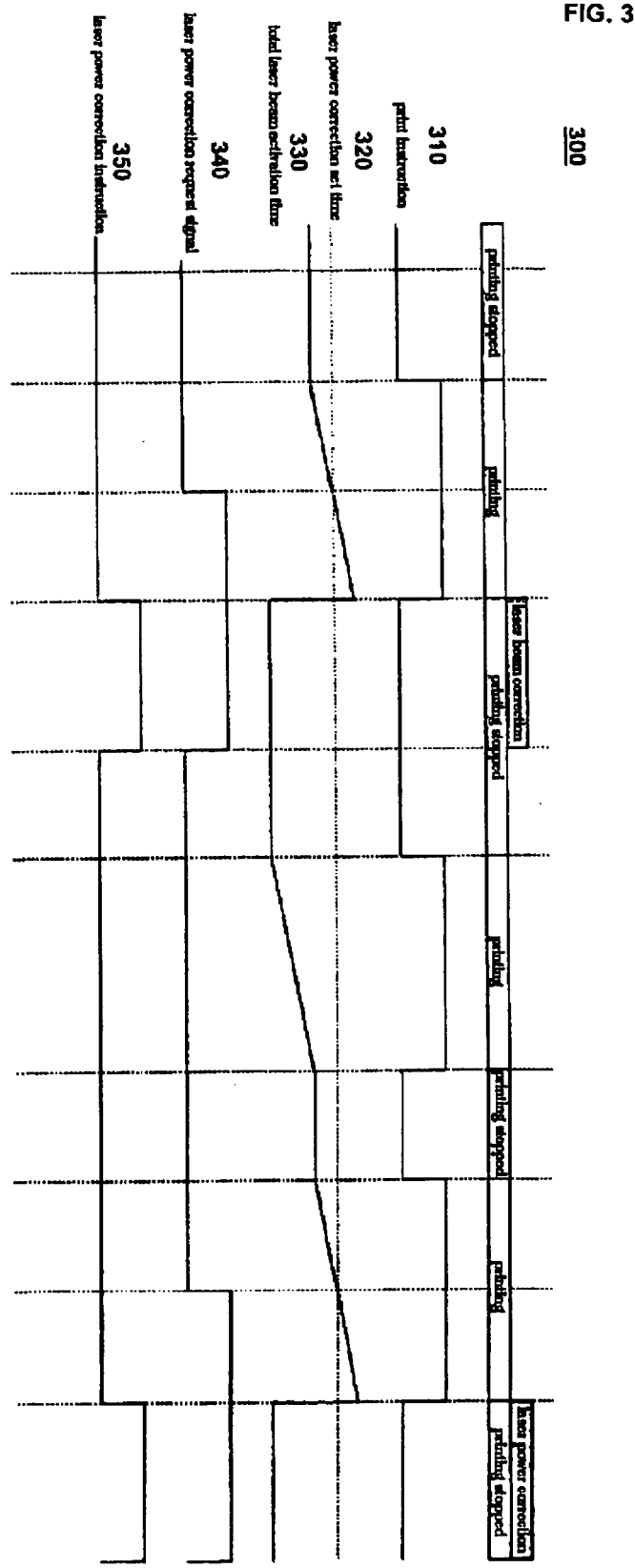
FIG. 3 illustrates a timing diagram 300 for explaining an operation of an embodiment of the present invention.

FIG. 3 shows a timing chart 300 of the operation of a non-limiting embodiment of the present invention. Specifically, given a print instruction 310, when the total laser activation time 330 exceeds a laser power correction set time 320, a laser power correction request signal 340 is output to indicate this condition.

As further shown in FIG. 3, when printing stops, if a laser power correction request signal 340 has been output, then a laser power correction instruction 350 is output, and laser power correction is applied. By resetting the total laser beam activation time at this point, laser power can be corrected periodically.

Figure 4:
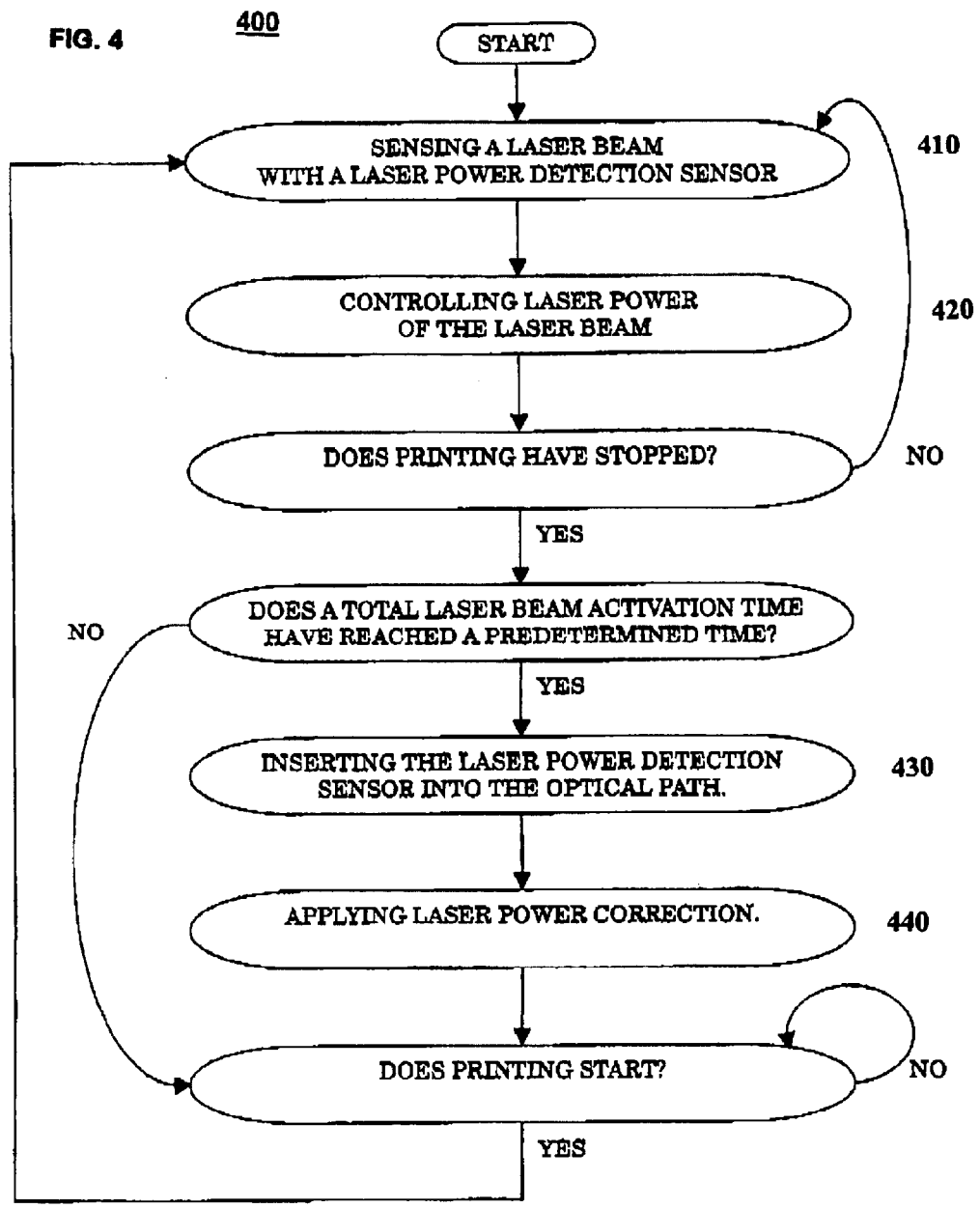
FIG. 4 illustrates a method 400 for correcting a laser power in an electrophotographic device according to the present invention.

FIG. 4 illustrates a method 400 for correcting a laser power in an electrophotographic device according to the present invention. The method includes a step 410 of sensing of a laser beam with a laser power detection sensor which is retractably disposed relative to a laser beam optical path. Then, after the sensing, a step 420 is performed of controlling the laser power of the laser beam based on an output from the laser power detection sensor. Subsequently, the method includes a step 430 of inserting the laser power detection sensor into the optical path when a total laser beam activation time has reached a predetermined time and printing is stopped. And then, the method includes a step 440 of applying laser power correction.

As described above, the present invention provides a laser power correction device and laser power correction method for electrophotographic devices that stabilizes print quality, and restricts variations in print density within individual printing volume units.

While the invention has been described in terms of several preferred embodiments, those skilled in the art will recognize that the invention can be practiced with modification within the spirit and scope of the appended claims.

Further, it is noted that Applicant's intent is to encompass equivalents of all claim elements, even if amended later during prosecution.

What is claimed is:

1. An electrophotographic device, comprising:

a laser power detection sensor retractably disposed relative to a laser beam optical path of a laser beam;

laser power adjusting means for controlling a laser power of said laser beam based on an output from said laser power detection sensor;

controlling means for inserting said laser power detection sensor into said optical path and for applying laser power correction when a total laser beam activation time has reached a predetermined time and printing is stopped;

a laser light source for generating the laser beam for optically recording onto an exposure surface; and an internal sensor located within said laser light source for monitoring laser power from said laser light source, wherein said laser power is adjusted at predetermined intervals by said laser power adjusting means while said internal sensor monitors said laser power continuously.

2. An electrophotographic device, comprising:

a laser power detection sensor retractably disposed relative to a laser beam optical path of a laser beam;

laser power adjusting means for controlling a laser power of said laser beam based on an output from said laser power detection sensors;

controlling means for inserting said laser power detection sensor into said optical path and for applying laser power correction when a total laser beam activation time has reached a predetermined time and printing is stopped;

a laser light source for generating the laser beam for optically recording onto an exposure surface; and an internal sensor located within said laser light source for monitoring laser power from said laser light source, wherein said internal sensor outputs a first signal to said laser power adjusting means.

3. The device according to claim 2, wherein said laser power detection sensor outputs a second signal to said laser power adjustment means.

4. The device according claim 3, wherein said laser power adjusting means outputs a third signal, based upon an input of at least one of said first signal and said second signal, to said laser light source to fix an output of said laser power of said laser beam.

5. A method of correcting a laser power in an electrophotographic device, comprising:

sensing a laser beam with a laser power detection sensor retractably disposed relative to a laser beam optical path;

controlling laser power of said laser beam based on an output from said laser power detection sensor;

inserting said laser power detection sensor into said optical path; and applying laser power correction when a total laser beam activation time has reached a predetermined time and printing is stopped;

generating the laser beam with a laser light source for optically recording onto an exposure surface; and monitoring laser power from said laser light source with an internal sensor located within said laser light source.

6. The method according to claim 5, further comprising:

adjusting said laser power at predetermined intervals while said internal sensor monitors said laser power continuously.

7. The method according to claim 5, wherein said applying laser power correction comprises adjusting the laser power based upon an input of a first signal from said internal sensor and a second signal from said laser power detection sensor.

* * * * *